United States Patent
Cho

(10) Patent No.: US 8,414,725 B2
(45) Date of Patent: Apr. 9, 2013

(54) APPARATUS AND METHOD OF FABRICATING FLAT PLATE DISPLAY

(75) Inventor: Seong-Pil Cho, Seoul (KR)

(73) Assignee: LG Display Co., Ltd., Seoul (KR)

(*) Notice: Subject to any disclaimer, the term of this patent is extended or adjusted under 35 U.S.C. 154(b) by 123 days.

(21) Appl. No.: 12/911,472

(22) Filed: Oct. 25, 2010

(65) Prior Publication Data

US 2011/0146894 A1     Jun. 23, 2011

(30) Foreign Application Priority Data

Dec. 17, 2009 (KR) .................. 10-2009-0126204

(51) Int. Cl.
    *B29C 59/00*     (2006.01)
    *B30B 5/00*     (2006.01)

(52) U.S. Cl. ............. 156/219; 156/209; 156/583.3; 264/293

(58) Field of Classification Search .......... 156/209, 156/219, 247, 583.3; 264/293, 284; 101/3.1–32
See application file for complete search history.

(56) References Cited

U.S. PATENT DOCUMENTS
2005/0206034 A1* 9/2005 Yokoyama et al. ......... 264/219

FOREIGN PATENT DOCUMENTS
| CN | 1902035 | | 1/2007 |
| CN | 101063813 A | | 10/2007 |
| CN | 101434141 | * | 5/2009 |
| CN | 101434141 A | | 5/2009 |

* cited by examiner

*Primary Examiner* — Katarzyna Wyrozebski Lee
*Assistant Examiner* — Carson Gross
(74) *Attorney, Agent, or Firm* — McKenna Long & Aldridge, LLP

(57) ABSTRACT

Disclosed is a method of fabricating and apparatus of a flat plate display that is able to separate a substrate and an imprinting mold from each other with a relatively small force. The fabricating apparatus of a flat plate display includes an imprinting mold which is boned with a substrate to form a thin film pattern on the substrate, the imprinting mold comprising projections and grooves; and a movable separation part configured to rotatably move from a one side toward the other side of the imprinting mold to vacuum-absorb the imprinting mold.

6 Claims, 7 Drawing Sheets

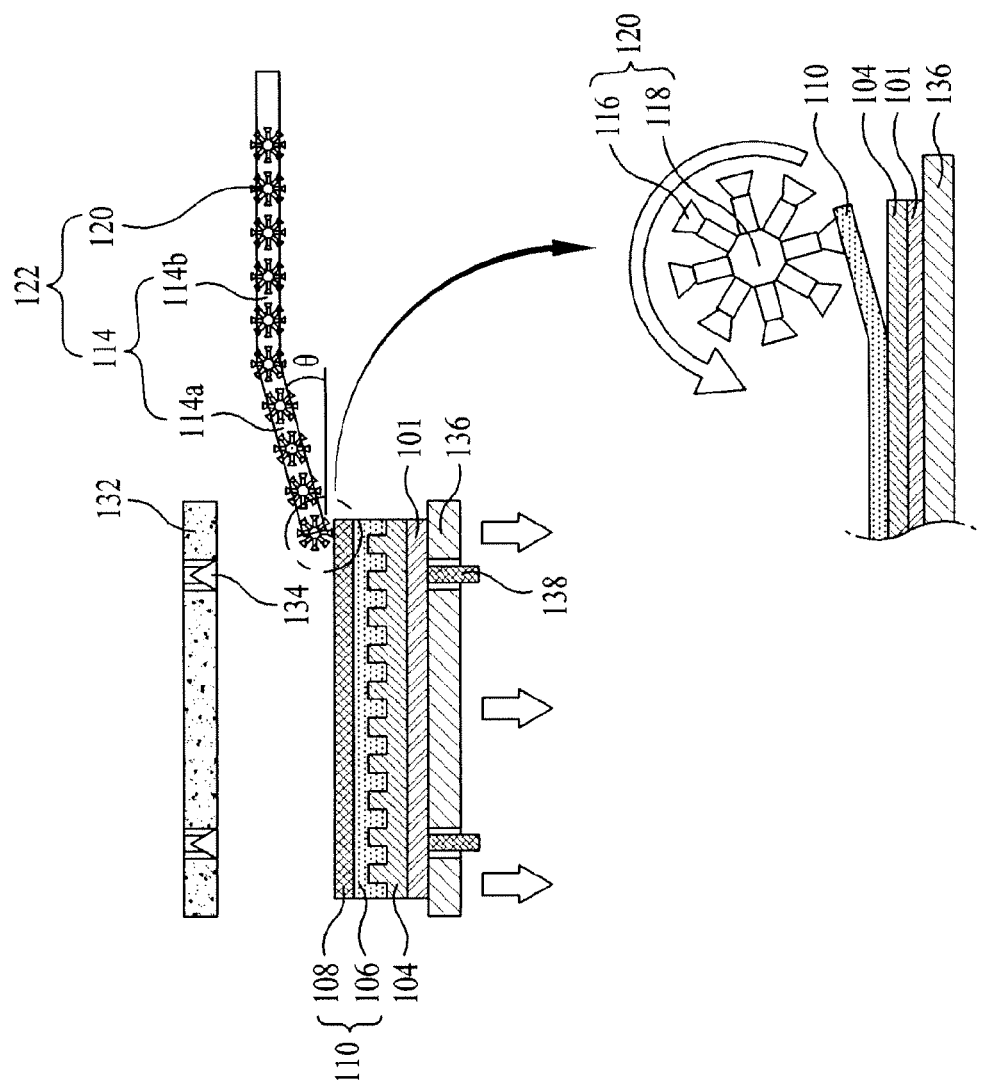

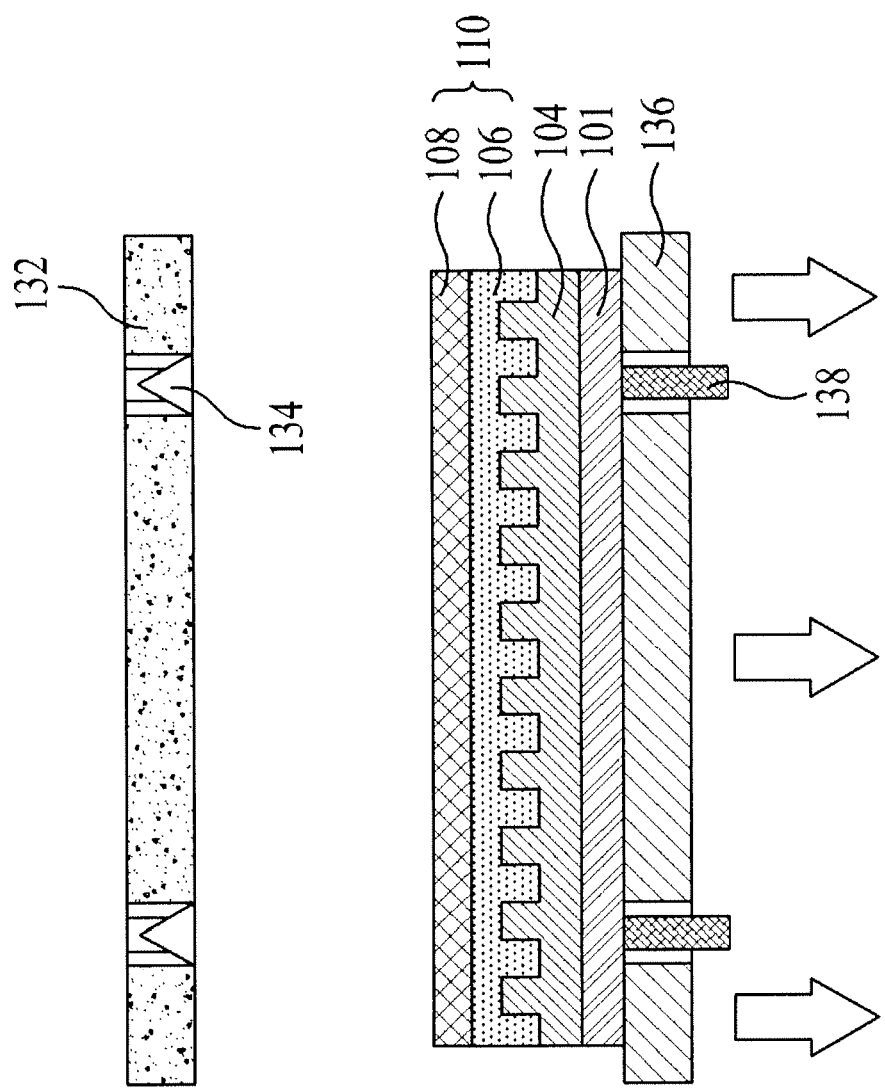

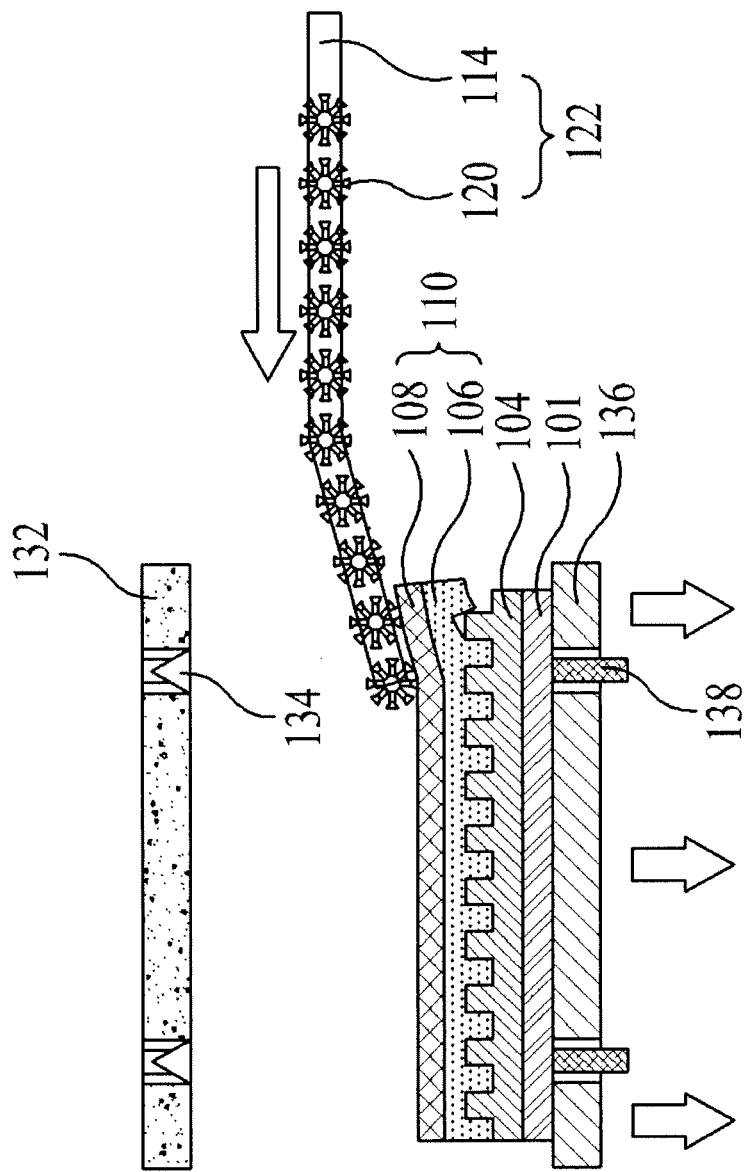

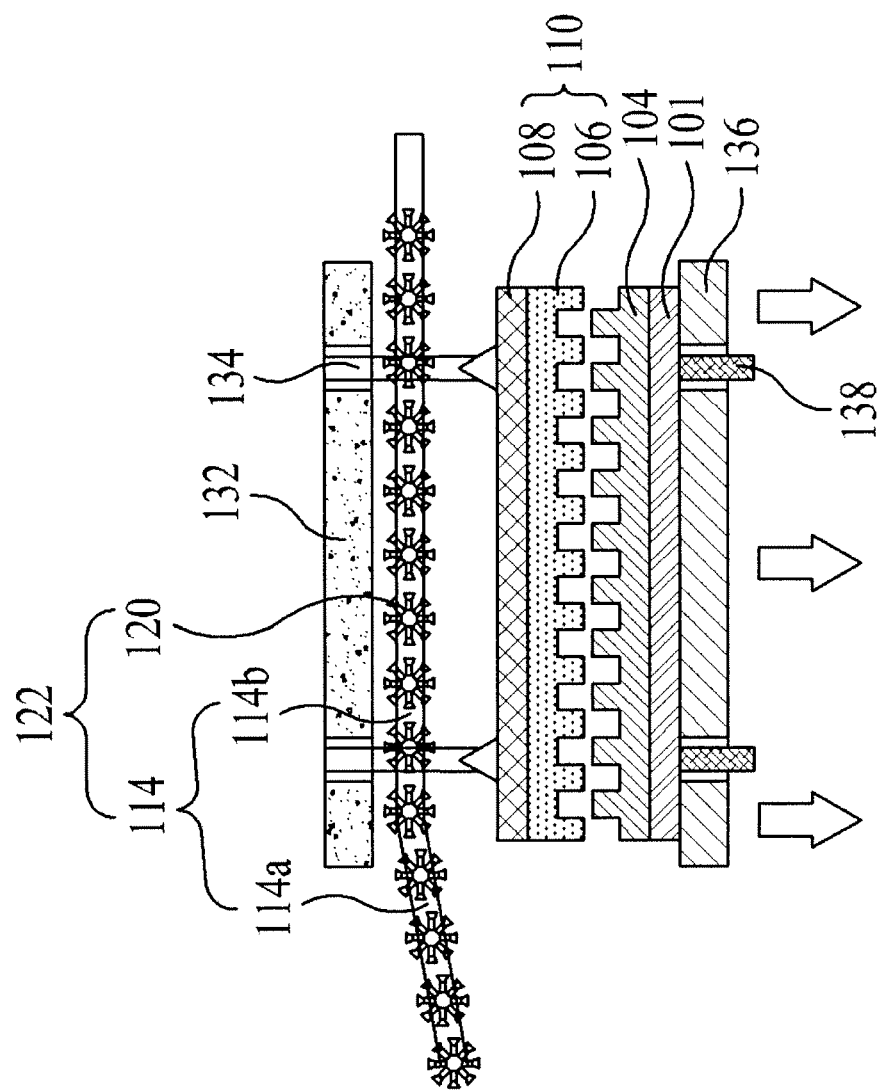

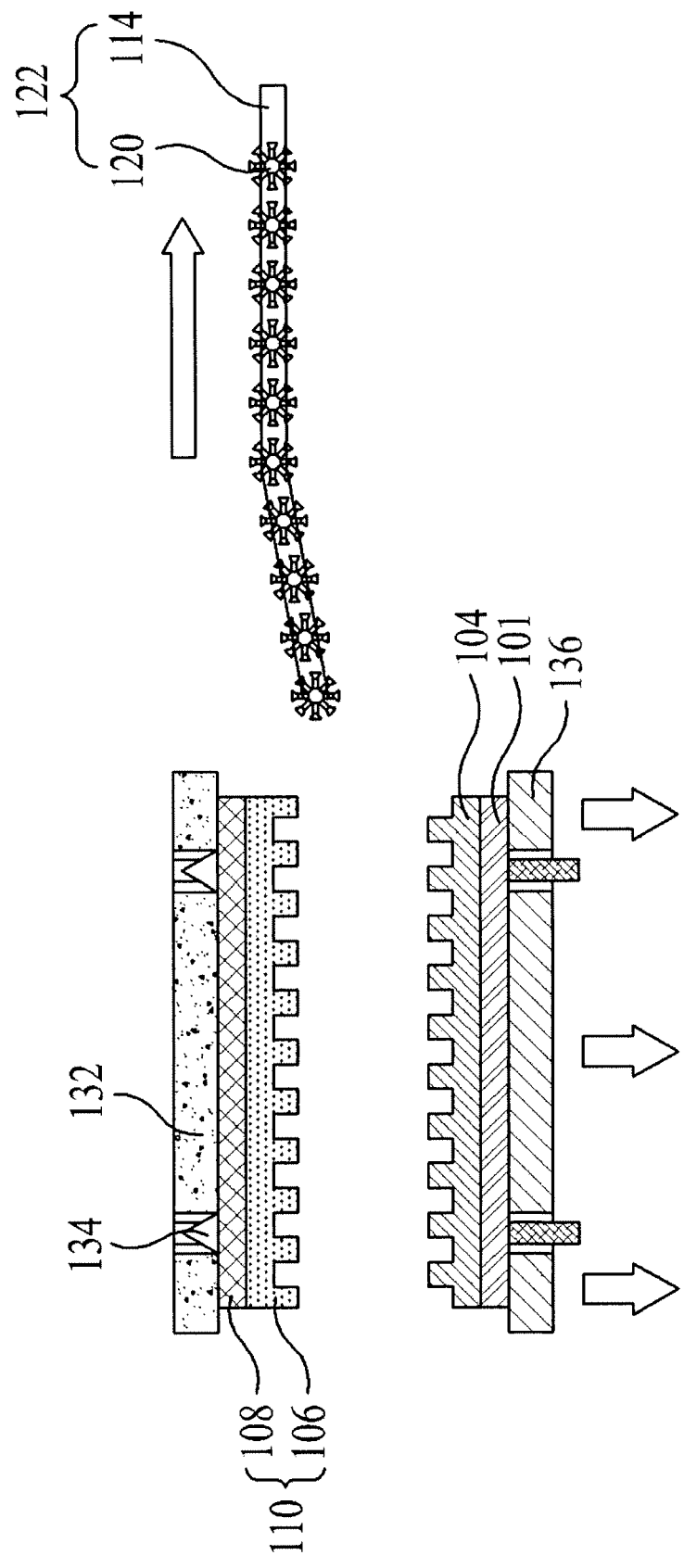

APPARATUS AND METHOD OF FABRICATING FLAT PLATE DISPLAY

CROSS REFERENCE TO RELATED APPLICATION

This application claims the benefit of the Patent Korean Application No. 10-2009-0126204, filed on Dec. 17, 2009, which is hereby incorporated by reference as if fully set forth herein.

BACKGROUND OF THE DISCLOSURE

1. Field of the Disclosure

The present invention relates to an apparatus and method of fabricating a flat plate display capable of separating a substrate and an imprinting mold with a relatively small force.

2. Discussion of the Related Art

Various kinds of flat plate displays capable of reducing a weight and volume which are disadvantages of a cathode ray tube (CRT) haven been emerging recently. Such a flat plate display includes a liquid crystal display (LCD), a field emission display, a plasma display panel and an electro-luminescence (EL) display.

This flat plate display is configured of a plurality of thin films formed by a mask process including depositing (coating), exposing, developing and etching. However, the mask process has complicated fabricating assembly process and it has a disadvantage of high production cost. As a result, research and study haven been under progress to form thin films via a patterning process using an imprinting mold in recent.

According to this patterning process, when a liquid polymeric precursor contacts with a mould for imprinting which has a groove and a projection after liquid resin is painted on a substrate, the groove and the projection of the imprinting mold are reverse-transferred to the liquid polymeric precursor and the reverse-transferred liquid polymeric precursor is hardened in a hardening process to form a desired thin film pattern on the substrate.

Here, after a related art thin film is formed, the imprinting mold and the substrate are separated from each other. At this time, if the size of the substrate is identical to that of the mould for imprinting, a lower stage in which the substrate is absorbed is spaced apart from an upper stage in which the imprinting mold is absorbed such that the front surface of the mould for imprinting is separated from the substrate simultaneously. As the area of the substrate is larger in case the front surface of the molds for imprinting is separated from the substrate simultaneously, a relatively larger mechanical force is required disadvantageously. In addition, the relatively large mechanical force might damage both of the substrate and the mould for imprinting.

Moreover, in case the imprinting mold is larger than the substrate, the imprinting mold may be separated from the substrate sequentially. In this case, a relatively small mechanical force is required to separate the imprinting mold from the substrate, compared with the simultaneous separation. However, since the size of the imprinting mold is getting larger as the substrate has a larger area, it is difficult to supply molds for imprinting applicable to large area the imprinting mold. Also, as the substrate has a larger area, the distance required to separate the imprinting mold from the substrate may be increased and the imprinting mold is likely to damage accordingly.

SUMMARY OF THE DISCLOSURE

Accordingly, the present invention is directed to a fabricating apparatus and a fabricating method of a flat plate display.

An advantage of the present invention is to provide a fabricating apparatus of a flat plate display which is able to separate a substrate and an imprinting mold from each other with a relatively small force.

Additional advantages, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a fabricating apparatus of a flat plate display includes an imprinting mold which is bonded with a substrate to form a thin film pattern on the substrate, the imprinting mold comprising projections and grooves; and a movable separation part configured to rotatably move from a one side toward the other side of the imprinting mold to vacuum-absorb the imprinting mold.

The movable separations part may include a plurality of rotating absorption parts configured to vacuum-absorb the imprinting mold; and a transfer jig configured to transfer and align the plurality of the rotating absorption parts.

Each of the rotating absorption parts may include a roller configured to rotate along the motion of the transfer jig; and a plurality of vacuum-absorbing parts attached to an outer circumferential surface of the roller to vacuum-absorb the imprinting mold.

The transfer jig may include an oblique jig formed obliquely at a predetermined angle with respect to the imprinting mold; and a horizontal jig connected with the oblique jig, in parallel to the imprinting mold.

The oblique jig may be formed obliquely at 15°~45° with respect to the imprinting mold and the length of the horizontal jig may be formed larger than the length of the imprinting mold.

In another aspect of the present invention, a fabricating method of a flat plate display includes steps of: bonding a substrate and an imprinting mold to form a thin film pattern on the substrate, the imprinting mold comprising projections and grooves; and separating the imprinting mold and the substrate from each other by vacuum-absorbing the imprinting mold, with moving a movable separation part from a one side toward the other side of the imprinting mold.

The step of separating the imprinting mold and the substrate from each other may include a step of transferring a plurality of rotating absorption parts from a one side toward the other side of the imprinting mold sequentially by using a transfer jig, to vacuum-absorb the imprinting mold.

The step of separating the imprinting mold and the substrate from each other may include a step of vacuum-absorbing the imprinting mold by using a plurality of vacuum absorbing parts included in the rotating absorption part which are attached to an outer circumferential surface of a roller of the rotating absorption part which rotates along the motion of the transfer jig.

The step of separating the imprinting mold and the substrate from each other may a step of transferring the plurality of the rotating absorbing parts by using the transfer jig comprising an oblique jig formed obliquely at a predetermined angle with respect to the imprinting mold and a horizontal jig connected with the oblique jig in parallel to the imprinting mold.

The oblique jig may be formed obliquely at 15°~45° with respect to the imprinting mold and the length of the horizontal jig may be formed larger than the length of the imprinting mold.

According to the fabricating apparatus and method of the flat plate display, the imprinting mold is sequentially separated from the substrate by using a shear force generated by the rotation of the movable separation part. In this case, compared with related art vertical-separation of an imprinting mold, the separation using the shear force may require a relatively small force and this may minimize damage to the imprinting mold as possible.

Furthermore, the imprinting mold and the substrate may be separated regardless of the size of the imprinting mold. As a result, this may be an advantage in enlargement of the substrate and equipment.

A still further, the separation time reduction with respect to the imprinting mold and the substrate may reduce the assembly work time resulting in enhanced productivity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings:

FIG. 1 is a sectional view illustrating an apparatus for fabricating a flat plate display according to an embodiment of the present invention;

FIG. 2A to 2E are sectional views illustrating a method of fabricating a flat plate display using the fabricating apparatus shown in FIG. 1.

DESCRIPTION OF SPECIFIC EMBODIMENTS

Figure 2C:
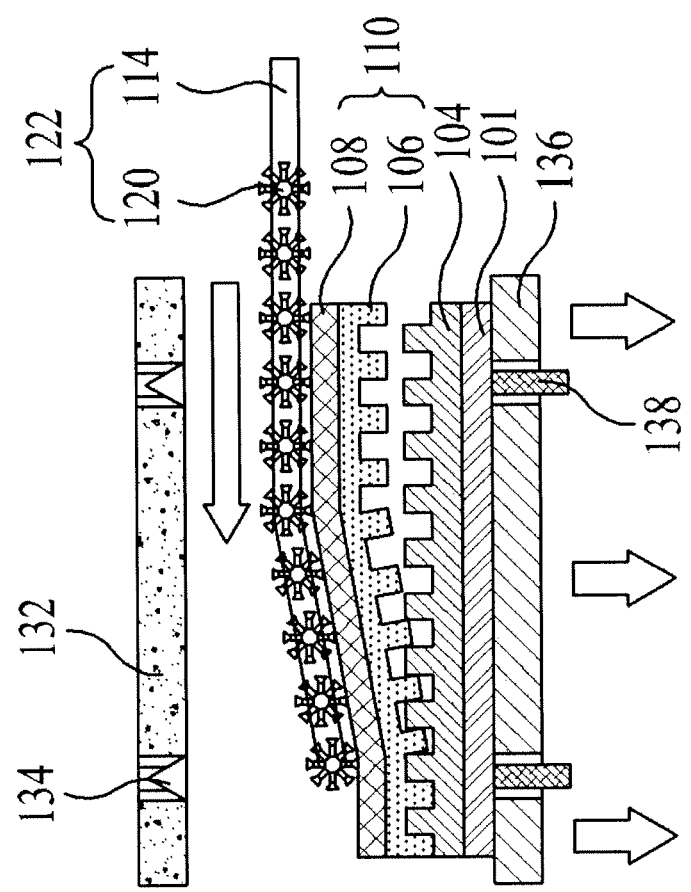

Reference will now be made in detail to the specific embodiments of the present invention, examples of which are illustrated in the accompanying drawings. Wherever possible, the same reference numbers will be used throughout the drawings to refer to the same or like parts.

FIG. 1 is a sectional view illustrating a fabricating apparatus for imprinting according to the present invention.

The fabricating apparatus for imprinting shown in FIG. 1 includes a substrate 101, an imprinting mold 110, an upper stage 132, a lower stage 136 and a movable separation part 122.

A thin film pattern 104 is formed after pressingly contacted and patterned b the imprinting mold 110. The thin film pattern 104 may be reverse-transferred with each of grooves and projections formed in the imprinting mold 110.

The imprinting mold 110 includes a back plane 108 and a mold part 106 formed on the back plane 108. The mold part 106 includes grooves and projections to form the thin film pattern 104.

The upper stage 132 absorbs the back plane 108 of the imprinting mold 110 via upper vacuum pins 134 to absorb the imprinting mold 110 separated from the substrate by the movable separation part 122.

The lower stage 136 fixedly absorbs the substrate 101 via lower vacuum lines 138.

The movable separation part 122 includes a plurality of rotating absorption part 120 configured to vacuum-absorb the imprinting mold 110 and a transfer jig 114 configured to transfer and align the plurality of the rotating absorption parts 120.

Each of the rotating absorption parts 120 includes a roller 118 and a plurality of vacuum-absorbing parts 116 formed along an outer circumferential surface of the roller 118.

The roller 118 is rotating with respect to a motion direction of the transfer jig 114 correspondingly.

The vacuum-absorbing parts 116 absorb the imprinting mold 110 via the transfer jig 114 and the roller which are connected with a vacuum pump (not shown).

The transfer jig 114 includes an oblique jig 114a and a horizontal jig 114b connected with the oblique jig 114a.

The horizontal jig 114b is formed in parallel to an upper surface of the imprinting mold 110 and also it is formed in opposite to the upper surface of the imprinting mold 110. Because of that, the horizontal jig 114b may be formed longer than the imprinting mold 110.

The oblique jig 114a is formed oblique at an angle of 5~45 degrees ($\theta$) with respect to the upper surface of the imprinting mold 110. As the oblique jig 114a is oblique with respect to the upper surface of the imprinting mold 110, a shear force will be generated along a rotation direction of the rotating absorption parts 120 attached to the oblique jig 114a when the imprinting mold 110 is separated from the substrate 101. since such the shear force is generated in the rotation direction of the rotating absorption parts 120, a relatively small force is required to separate the imprinting mold 110 from the substrate 101, in comparison to the force required to separating the imprinting mold 110 in a vertical direction.

FIGS. 2A to 2E are sectional views illustrating a fabricating method of a thin film pattern by using the fabricating apparatus for imprinting shown in FIG. 1.

First of all, liquid polymeric precursor is coated, for example, spin-coated or spinless-coated on the substrate 101. The substrate 101 having the liquid polymeric precursor coated thereon is fixedly absorbed to the lower stage 136 via the lower vacuum lines 138 as shown in FIG. 2A. The imprinting mold 110 having the grooves and projections formed therein is fixedly absorbed to the upper stage 132 via the upper vacuum-pins 134. after that, the imprinting mold 110 fixedly absorbed to the upper stage 132 via the upper vacuum pins 134 is moving downward to the substrate 101 such that the imprinting mold 110 and the liquid polymeric precursor may be bonded and hardened by heat or lights. Hence, solvent in the liquid polymeric precursor is absorbed to a surface of the imprinting mold 110 to move the liquid polymeric precursor into the grooves of the imprinting mold 110 such that the thin pattern 104 may be formed on the substrate 101. The thin film pattern 104 has a shape reverse-transferred from the grooves of the imprinting mold 110.

As mentioned above, the imprinting mold 110 and the substrate 101 fixedly absorbed to the upper stage 132 and the lower stage 136 shown in FIG. 2A, respectively, may be bonded with each other to form the thin film pattern 104 on the substrate. Rather than that, the imprinting mold 110 and the substrate 101 are bonded in an auxiliary external device to form the thin film pattern 104 on the substrate 101 and after that they may be transferred to the lower stage 136 shown in FIG. 2A in the bonded state.

The substrate 101 transferred to the lower stage 136 is fixedly absorbed to the lower stage 136 via the lower vacuum lines 138.

Hence, as shown in FIG. 2b, a predetermined portion of the imprinting mold in contact with the substrate 101 having the thin film pattern 104 formed thereon may contact with the movable separation part 122. The movable separation part 122 rotates the rotating absorbing parts 120, with moving from the predetermine portion of the imprinting mold 110 to the other opposite portion. As a result, a shear force is generated along the rotation direction of the rotating absorbing parts and the imprinting mold 110 in contact with the substrate 101 is fixedly absorbed to the rotating absorbing parts 120, with separated from the substrate 101. At this time, if the transfer speed of the movable separation part 122 is increased, the separation speed between the imprinting mold 110 and the substrate 101 will be increased. as completely separated from the substrate 101, the imprinting mold 110 may be in parallel to the horizontal jig 114b of the movable separation part 122 as shown in FIG. 2D. When the imprinting mold 110 is completely separated from the substrate 101 having the thin film pattern 104 formed thereon, the upper vacuum-pins 134 of the upper stage 132 may move downward to the imprinting mold 110 to vacuum-absorb the imprinting mold 110.

After the imprinting mold 110 is vacuum-absorbed to the upper stage 132, the movable separation part 122 is separated from the imprinting mold 110 as shown in FIG. 2E and it moves for the next process. After that, the upper vacuum-pins 134 moves upward to locate the imprinting mold 110 at the upper stage 132.

In the meanwhile, the embodiment of the present invention presents the fabricating apparatus of the flat plate display which vacuum-absorbs the imprinting mold 110 by using the movable separation part 122 to separate the imprinting mold 110 from the substrate. However, the present invention may be applicable to a case that the substrate is vacuum-absorbed by suing the movable separation part 122 to separate the substrate 101 from the imprinting mold 110.

Figure 3:
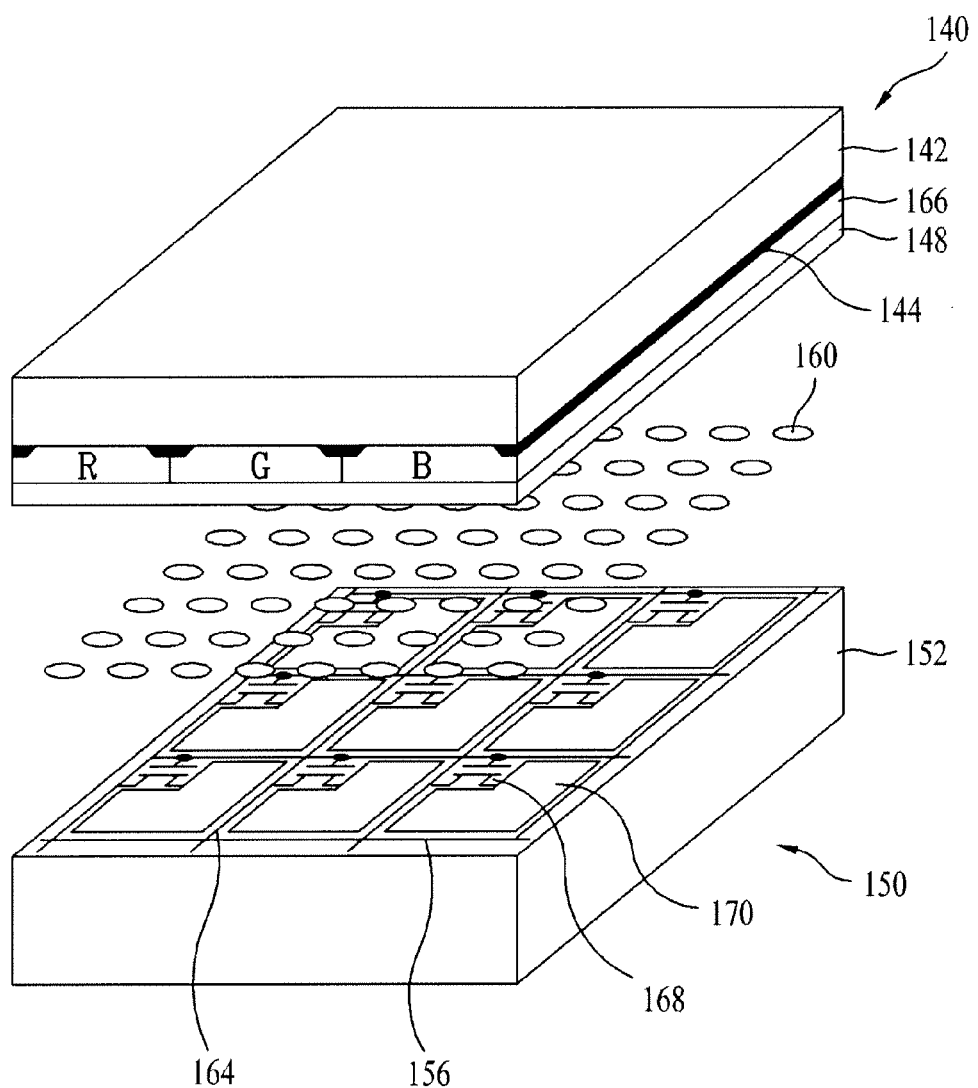
FIG. 3 is a perspective view illustrating a liquid crystal display panel having a thin film pattern formed by the fabricating method shown in FIGS. 2A to 2E.

The thin film pattern 104 formed by using the imprinting mold 110 is applicable to a liquid crystal display panel shown in FIG. 3. specifically, the liquid crystal display panel 3 according to the present invention shown in FIG. includes a thin film transistor substrates 150 and a color filter substrate 140 which are bonded in opposite, with a liquid crystal layer 160 formed there between.

The color filter substrate 140 includes a black matrix 144 formed on a top substrate 142 to prevent light escape, a color filter 166 configured to represent colors, a common electrode 148 configured to form a pixel electrode and an electric field, a cover-coat layer configured for planarization, a column spacer formed on the over-coat layer to maintain a cell gap and a top alignment layer (not shown) configured to cover the other components.

The thin film transistor substrate 150 includes gate lines 156 and data lines 164 which are formed on a lower substrate 152 with crossing each other, thin film transistors 169 located adjacent to cross points of the gate and data lines, pixel electrodes 170 formed in pixel regions formed by the crossover structure, and a lower alignment layer (not shown) configured to cover the other components.

Such the color filter 166, black matrix 154, column spacer, thin film transistors 168, gate lines 156 and data lines 164 and pixel electrode 170 may be formed by the patterning process using the above imprinting mold including the grooves corresponding to patterns thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A fabricating apparatus of a flat plate display comprising:
   an imprinting mold bonded with a substrate to form a thin film pattern on the substrate, the imprinting mold comprising projections and grooves; and
   a movable separation part configured to rotatably move from one side toward other side of the imprinting mold to vacuum-absorb the imprinting mold,
   wherein the movable separation part comprises:
      a plurality of rotating absorption parts configured to vacuum-absorb the imprinting mold; and
      a transfer jig configured to transfer and align the plurality of the rotating absorption parts,
   wherein the transfer jig comprises:
   an oblique jig formed obliquely at a predetermined angle with respect to the imprinting mold; and
   a horizontal jig connected with the oblique jig, in parallel to the imprinting mold and
   wherein the rotating absorption parts are positioned on the oblique jig and the horizontal jig.

2. The fabricating apparatus of claim 1, wherein each of the rotating absorption parts comprises:
   a roller configured to rotate along the motion of the transfer jig; and
   a plurality of vacuum-absorbing parts attached to an outer circumferential surface of the roller to vacuum-absorb the imprinting mold.

3. The fabricating apparatus of claim 1, wherein the oblique jig is formed obliquely at 15°~45° with respect to the imprinting mold and the length of the horizontal jig is formed larger than the length of the imprinting mold.

4. A fabricating method of a flat plate display comprising steps of:
   bonding a substrate and an imprinting mold to form a thin film pattern on the substrate, the imprinting mold comprising projections and grooves; and
   separating the imprinting mold and the substrate from each other by vacuum-absorbing the imprinting mold, with moving a movable separation part from one side toward the other side of the imprinting mold,
   wherein the step of separating the imprinting mold and the substrate from each other comprises a step of:
   transferring a plurality of rotating absorption parts from a predetermined side toward the other opposite side of the imprinting mold sequentially by using a transfer jig to vacuum-absorb the imprinting mold, wherein the transfer jig comprises an oblique jig formed obliquely at a predetermined angle with respect to the imprinting mold and a horizontal jig connected with the oblique jig, wherein the horizontal jig is parallel to and opposite an upper surface of the imprinting mold, and
   wherein the rotating absorption parts are positioned on the oblique jig and the horizontal jig.

5. The fabricating method of claim 4, wherein the step of separating the imprinting mold and the substrate from each other comprises a step of:
   vacuum-absorbing the imprinting mold by using a plurality of vacuum absorbing parts included in the rotating absorption part which are attached to an outer circumferential surface of a roller of the rotating absorption part which rotates along the motion of the transfer jig.

6. The fabricating method of claim 4, wherein the oblique jig is formed obliquely at 15°~45° with respect to the imprinting mold and the length of the horizontal jig is formed larger than the length of the imprinting mold.

* * * * *